United States Patent [19]
Hanson et al.

[11] Patent Number: 5,181,389
[45] Date of Patent: Jan. 26, 1993

[54] METHODS AND APPARATUS FOR MONITORING THE OPERATION OF A TRANSPORT REFRIGERATION SYSTEM

[75] Inventors: Jay L. Hanson, Bloomington; Romuald M. Jurewicz, St. Louis Park, both of Minn.

[73] Assignee: Thermo King Corporation, Minneapolis, Minn.

[21] Appl. No.: 875,861

[22] Filed: Apr. 26, 1992

[51] Int. Cl.⁵ .................................. F25B 49/00
[52] U.S. Cl. ................................. 62/126; 62/127; 62/130; 62/239; 340/589; 364/557
[58] Field of Search ............... 62/126, 127, 129, 130, 62/157, 158, 160, 228.4, 231, 155, 239, 243; 340/585, 588, 589, 870.17; 236/94; 165/11.1; 364/557

[56] References Cited

U.S. PATENT DOCUMENTS

| | | | |
|---|---|---|---|
| 3,946,573 | 3/1976 | Nichols et al. | 62/126 |
| 4,028,688 | 6/1977 | Goleman | 340/585 X |
| 4,146,085 | 3/1979 | Wills | 165/11 |
| 4,381,549 | 4/1983 | Stamp, Jr. et al. | 364/557 |
| 4,399,428 | 8/1983 | Hughes et al. | 340/500 |
| 4,685,615 | 8/1987 | Hart | 236/94 |
| 4,766,553 | 8/1988 | Kaya et al. | 364/506 |
| 4,819,441 | 4/1989 | Hanson | 62/160 |
| 4,903,498 | 2/1990 | Hanson | 62/160 |
| 4,903,500 | 2/1990 | Hanson | 62/156 |
| 4,903,502 | 2/1990 | Hanson et al. | 62/228.5 |
| 4,949,550 | 8/1990 | Hanson | 62/130 X |
| 4,970,496 | 11/1990 | Kirkpatrick | 340/585 |
| 5,123,252 | 6/1992 | Hanson | 236/94 X |

Primary Examiner—Harry B. Tanner
Attorney, Agent, or Firm—D. R. Lackey

[57] ABSTRACT

A transport refrigeration unit, and methods and apparatus for monitoring the operation thereof, with the unit conditioning a load to a selected set point temperature via commanded cooling and heating cycles. A thermostat provides a digital signal as a function of the load temperature and the selected set point temperature, with each toggling of the least significant bit (LSB) thereof indicating a predetermined change in load temperature. A timer initiates a predetermined timing period with each toggling of the LSB, with the timing period being a dynamic function of the selected set point temperature. Expiration of the timing period before the next bit toggle initiates an alarm signal indicating the rate-of-change of load temperature is not within an acceptable limit for the selected set point temperature. A comparison of successive digital signals also results in an alarm signal when the direction of temperature change is not consistent with the commanded operating cycle.

22 Claims, 9 Drawing Sheets

| MODE-TEMP. FALLING ↓ | DIGITAL SIGNAL MSB → LSB | | | | | | | | WORD # | TEMP. RESET POINT | |
|---|---|---|---|---|---|---|---|---|---|---|---|
| | A | B | C | D | E | F | G | H | | | |
| | 0 | 0 | 0 | 0 | 0 | 0 | 0 | 0 | 1 | +27 | H.S. COOL NOT-IN RANGE |
| H.S. COOL NOT-IN RANGE | 0 | 1 | 0 | 1 | 1 | 1 | 1 | 1 | 95 | +6.7 | |
| | 0 | 1 | 1 | 0 | 0 | 0 | 0 | 0 | 96 | | H.S. COOL IN RANGE |
| | 0 | 1 | 1 | 0 | 0 | 1 | 1 | 1 | 103 | +5.0 | |
| | 0 | 1 | 1 | 0 | 1 | 0 | 0 | 0 | 104 | | |
| | 0 | 1 | 1 | 0 | 1 | 1 | 1 | 1 | 111 | +3.4 | L.S. COOL IN RANGE |
| | 0 | 1 | 1 | 1 | 0 | 0 | 0 | 0 | 112 | | |
| L.S. COOL IN RANGE | 0 | 1 | 1 | 1 | 0 | 1 | 1 | 1 | 119 | +1.7 | |
| | 0 | 1 | 1 | 1 | 1 | 0 | 0 | 0 | 120 | | L.S. HEAT IN RANGE |
| | 0 | 1 | 1 | 1 | 1 | 1 | 1 | 1 | 127 | ←SET POINT | |
| | 1 | 0 | 0 | 0 | 0 | 0 | 0 | 0 | 128 | | |
| L.S. HEAT IN RANGE | 1 | 0 | 0 | 0 | 0 | 1 | 1 | 1 | 135 | -1.5 | |
| | 1 | 0 | 0 | 0 | 1 | 0 | 0 | 0 | 136 | | H.S. HEAT NOT-IN RANGE |
| | 1 | 0 | 0 | 0 | 1 | 1 | 1 | 1 | 143 | -3.2 | |
| H.S. HEAT IN RANGE | 1 | 0 | 0 | 1 | 0 | 0 | 0 | 0 | 144 | | |
| | 1 | 0 | 0 | 1 | 1 | 1 | 1 | 1 | 159 | -6.5 | |
| H.S. HEAT NOT-IN RANGE | 1 | 0 | 1 | 0 | 0 | 0 | 0 | 0 | 160 | | |
| | 1 | 1 | 1 | 1 | 1 | 1 | 1 | 1 | 256 | -27 | |

MODE-TEMP. RISING ↑

ROM LOOK-UP TABLE #1
OPERATING MODES WITH FALLING TEMP. — 125

| ΔT WORD # | OPERATING MODE |
|---|---|
| 1-111 | HSC-NIR |
| 112-127 | LSC-IR |
| 128-143 | LSH-IR |
| 144-159 | HSH-IR |
| 160-256 | HSH-NIR |

FIG. 7

ROM LOOK-UP TABLE #2
OPERATING MODES WITH RISING TEMP. — 127

| ΔT WORD # | OPERATING MODE |
|---|---|
| 256-136 | HSH-NIR |
| 135-120 | LSH-IR |
| 119-104 | LSC-IR |
| 103-96 | HSC-IR |
| 95-1 | HSC-NIR |

FIG. 8

ROM LOOK-UP TABLE #3
MINIMUM R/C TIME VALUES — 157

| SET POINT | R/C TIME VALUE |
|---|---|
| >50° F | 2 MIN. |
| 20-50° F | 3 MIN. |
| 0-20° F | 4 MIN. |
| 20-0 | 8 MIN. |

FIG. 9

RAM TIMERS — 65

| TIMERS | FUNCTIONS |
|---|---|
| P/U | POWER UP |
| M/C | COOL/HEAT MODE CHANGE |
| D/D | DEFROST DURATION |
| D/T | DEFROST TERMINATION |
| O/R | OUT-OF-RANGE |

FIG. 10

RAM TIMERS — 55

| FLAG | FUNCTIONS |
|---|---|
| SRA | STORED READING AVAILABLE |
| SPR | SET POINT REACHED |
| RCS | R/C VALUE STORED |
| IRF | IN-RANGE |
| UOF | UNIT OFF FLAG |

FIG. 11

RAM ACTUAL OPERATING MODE — 129

| |
|---|
| COOL |
| FROZEN (HEAT LOCK OUT) |
| HEAT |
| IN-RANGE |
| NOT-IN-RANGE |
| HIGH SPEED |
| LOW SPEED |
| DEFROST |

FIG. 12

RAM INPUT READINGS — 81

| |
|---|
| LATEST READING |
| ΔT WORD |
| HEAT/COOL |
| IN-RANGE/NOT-IN-RANGE |
| HEAT LOCKOUT |
| DEFROST |
| PRIOR READING |
| ΔT WORD |
| HEAT/COOL |
| IN-RANGE/NOT-IN-RANGE |
| HEAT LOCKOUT |
| DEFROST | ns.
METHODS AND APPARATUS FOR MONITORING THE OPERATION OF A TRANSPORT REFRIGERATION SYSTEM

TECHNICAL FIELD

The invention relates in general to transport refrigeration systems, and more specifically to methods and apparatus for monitoring the operation thereof.

BACKGROUND ART

Transport refrigeration units or systems condition the air of cargo spaces associated with straight trucks, tractor-trailer combinations, refrigerated containers or "reefers", and the like. The usually high value of the cargo in the conditioned load space of the associated vehicle makes it important that transport refrigeration systems be highly reliable. However, even the most reliable transport refrigeration system is subject to occasional malfunction, and thus it is also important that monitoring methods and apparatus be employed that will provide a very early indication of a malfunction, and the nature of the malfunction. It is also important that such indication of a malfunction, and its nature, be communicated to the proper personnel, so that steps may be taken to correct the problem before damage to the conditioned load occurs. At the very least, a malfunction alarm should be communicated to a person directly in charge of the transport refrigeration system, such as to the driver of a truck or tractor-trailer. Since remote monitoring of transport refrigeration units via radio and satellites is now utilized by some trucking companies, it is further important that the format of any alarm communication system be compatible with, and suitable for, use with such remote monitoring systems.

Thus, it would be desirable, and it is an object of the present invention, to provide new and improved monitoring methods and apparatus for transport refrigeration systems which provides a very early indication of a possible malfunction, along with an indication of the nature of the malfunction. It is also desirable, and is another object of the invention, to provide the status of the monitored unit in a format suitable for transmission to a display in the cab of an associated vehicle, and also suitable for radio communication to a site remote from the location of the transport refrigeration system being monitored.

SUMMARY OF THE INVENTION

Briefly, the invention relates to monitoring methods and monitoring apparatus for monitoring a transport refrigeration system or unit which conditions a load in a cargo space to a selected set point temperature via commanded cooling and heating cycles. A method of the invention comprises the steps of:

(1) determining the temperature of the conditioned load, (2) providing a digital signal as a function of the load temperature and the set point temperature, with each toggle of the least significant bit (LSB) of the digital signal indicating a predetermined change in load temperature, (3) starting timing means having a predetermined timing period in response to the toggling of the LSB, (4) selecting the predetermined timing period as a function of the selected set point temperature, and (5) providing an alarm signal when the selected timing period expires before the next toggle of the LSB.

Monitoring apparatus for monitoring the operation of a transport refrigeration system which conditions a load in a cargo space to a selected set point temperature via cooling and heating cycles, includes sensor means providing a signal indicative of the temperature of the conditioned load, and set point selector means providing a signal indicative of the selected set point temperature. The apparatus further includes thermostat means which provides a digital signal as a function of the load temperature and the set point temperature, with each toggle of the least significant bit (LSB) of the digital signal indicating a predetermined change in load temperature. The apparatus further includes timing means, means responsive to the toggling of the LSB for causing the timing means to initiate a predetermined timing period, means dynamically selecting the predetermined timing period of the timing means as a function of the magnitude of the set point temperature, and alarm means responsive to the toggling of the LSB and the predetermined timing period. The alarm means provides an alarm signal when the selected timing period expires before the next toggle of the LSB.

Such methods and apparatus provide a very early warning of a possible malfunction, as it is not necessary for the temperature of the conditioned space to approach or reach the selected set point temperature before a generated as a function of the actual load temperature relative to the selected set point temperature provides a toggle of the least significant bit (LSB) for each small incremental change of load temperature, such as 0.2125° F. per bit toggle, for example. By relating an acceptable rate-of-change period of time between bit toggles to the magnitude of the selected set point temperature, an exceedingly early warning of a possible malfunction is provided, without generating unnecessary or false warnings. This rate-of-change of temperature warning, along with other warnings of possible malfunction, all of which uniquely identify the nature of the detected malfunction, are placed in a digital status message. The status message is periodically serially transmitted from the monitoring apparatus, which is located with the transport refrigeration unit being monitored, via power line modems to a driver display, and also to a radio or transceiver which is set to broadcast the signal to a selected remote location via radio.

BRIEF DESCRIPTION OF THE DRAWINGS

The invention will become more apparent by reading the following detailed description in conjunction with the drawings, which are shown by way of example only, wherein:

FIG. 3 sets forth a digital algorithm employed by the digital thermostat shown in block form in FIG. 2, illustrating various operating modes of a transport refrigeration unit for different values of a digital output signal provided by the digital thermostat;

FIGS. 6, 7 and 8 set forth ROM (read-only-memory) maps of various look-up tables utilized by the program set forth in FIGS. 4A, 4B, and 4C; and FIGS. 9, 10, 11, 12 and 13 respectively illustrate RAM (random-access-memory) maps of software timers, program flags, actual operating mode, input signals received by the monitoring apparatus, and a status message suitable for serial communication, utilized and/or prepared by, the program set forth in FIGS. 4A, 4B, 4C and 5.

DESCRIPTION OF PREFERRED EMBODIMENTS

Figure 1:
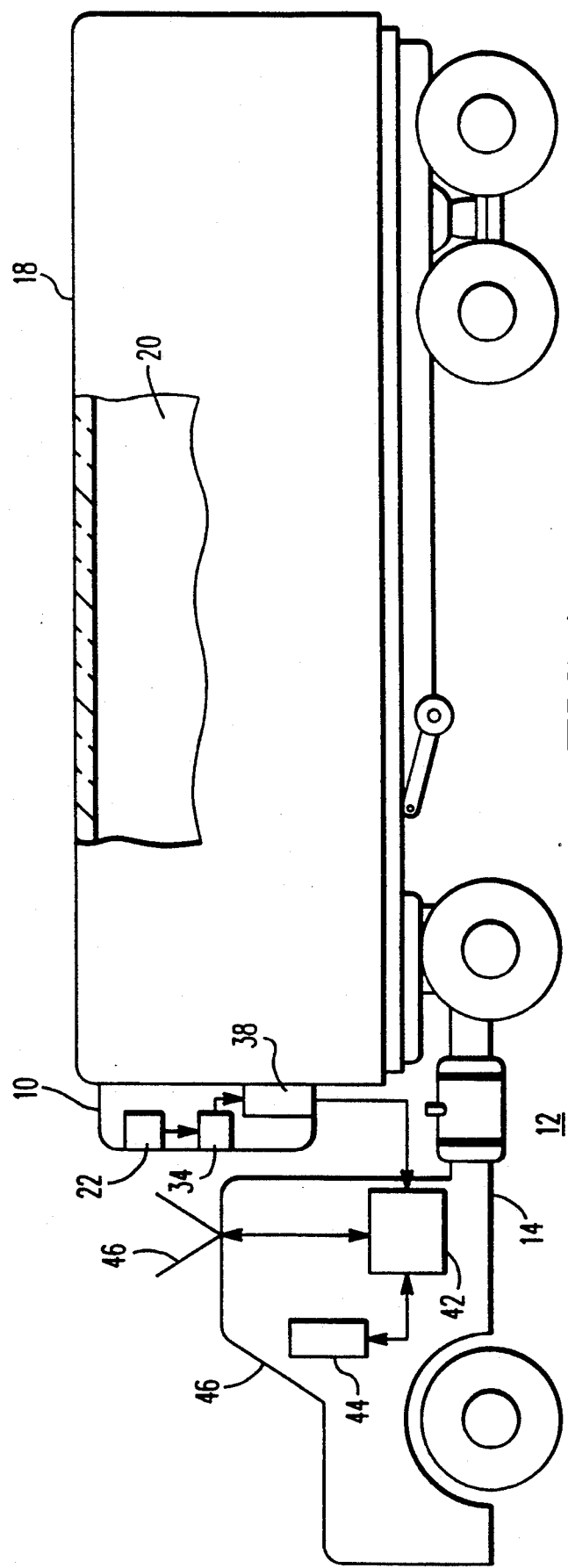
FIG. 1 is an elevational view of a transport refrigeration unit and associated monitoring apparatus, associated with a tractor-trailer combination, with the monitoring apparatus, shown in block form, being suitable for construction according to the teachings of the methods and apparatus of the invention.

Referring now to the drawings, and to FIG. 1 in particular, there is shown a transport refrigeration unit 10 associated with a tractor-trailer combination 12, comprising a tractor 14 which includes a driver's cab 16, and a trailer 18 having an insulated cargo space 20. Cargo space 20 may have one or more compartments to be conditioned by unit 10, as desired. The tractor-trailer combination 12 is shown for purposes of example only, as the invention is equally suitable for use with any vehicle or portable cargo space which utilizes a transport refrigeration unit to condition a load, or loads, in an associated cargo space, or spaces.

Figure 2:
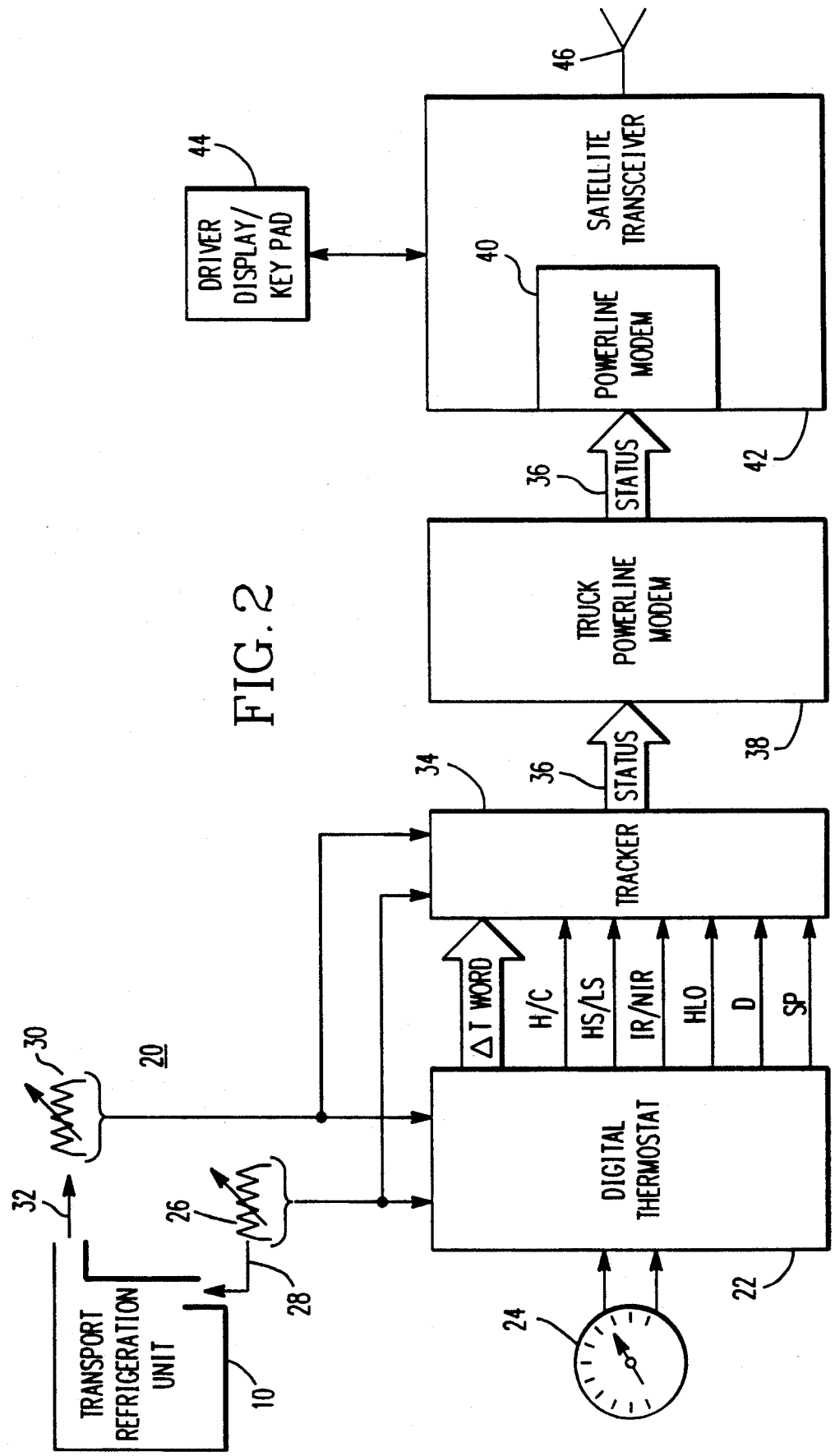
FIG. 2 is a more detailed block diagram of the block diagram set forth in FIG. 1, illustrating a digital thermostat, monitoring apparatus or "tracker", and a suitable communication system for conveying warning alarms to remote locations.

Referring now to FIGS. 1 and 2, transport refrigeration unit 10 includes a digital thermostat 22, ie., a thermostat which provides an a digital output signal, eg., an 8 bit digital word, as a function of the actual temperature of the load in cargo space 20, and the desired or set point temperature, as manually selected on a set point temperature selector 24. Digital thermostat 22 may be either of the digital thermostats shown in U.S. Pat. Nos. 4,819,441 and 4,903,498, for example, which patents are assigned to the same assignee as the present application.

For purposes of example, the digital thermostat of U.S. Pat. No. 4,903,498 is selected to provide a digital output signal required by the teachings of the invention, and accordingly U.S. Pat. No. 4,903,498 is hereby incorporated into the specification of the present application by reference. As illustrated in the digital algorithm set forth in FIG. 3, which is the same as FIG. 4 of the incorporated patent, thermostat 22 provides an 8 bit digital signal, with the bits being identified with the letters A through H. Bit A is the most significant bit (MSB), and bit H is the least significant bit (LSB).

The digital value of the digital signal provided by thermostat 22 indicates the temperature of the cargo space 20 relative to the selected set point temperature, and thus the digital signal is also referred to as a T word, as it indicates the temperature difference or, T, between the current load temperature and the selected set point temperature. The LSB "H" of the T word toggles, i.e., changes logic state, from a logic one to a logic zero, or vice versa, for each predetermined increment of cargo space temperature change, such as 0.2125° F., for example.

The temperature of cargo space 20 is provided by one or more temperature sensors, such as a return air sensor 26, which senses the temperature of return air, indicated by arrow 28. Return air 28 is the air which flows from cargo space 20 to transport refrigeration unit 10, being drawn into transport refrigeration unit 10 by an evaporator blower or fan (not shown) associated with transport refrigeration unit 10. The specific construction of transport refrigeration unit 10 is not important to the invention, and details thereof are not illustrated. Reference may be had to U.S. Pat. Nos. 4,182,134 and 4,736,597, for example, which are assigned to the same assignee as the present application, for typical constructional details.

The temperature of cargo space 20 may also be indicated by a discharge air sensor 30, which senses the temperature of discharge air, indicated by arrow 32. Discharge air is the conditioned air which is discharged into cargo space 20 by the hereinbefore mentioned evaporator fan or blower. The digital thermostat 22 may utilize a selected one of the temperature sensors 26 and 30, or both, to control the temperature of cargo space 20 to a predetermined narrow temperature band relative to the selected set point temperature.

The digital algorithm set forth in FIG. 3 indicates various operating modes commanded by thermostat 22, with the operating modes and the associated word numbers being set forth along the left-hand and right-hand sides of the diagram. The left-hand side illustrates the operating modes, and the word # at which they change, for a falling temperature in cargo space 20, and the right-hand side illustrates the operating modes, and the word # at which they change, for a rising temperature in cargo space 20.

The digital algorithm of FIG. 3 sets forth an algorithm for a continuous operating mode, wherein set point temperature is held by cycling back and forth between cooling and heating cycles. It is to be understood that a start-stop algorithm may also be used, wherein the refrigerant prime mover is stopped when the conditioned load requires neither a cooling cycle nor a heating cycle to maintain the load temperature in a predetermined narrow "null" temperature band adjacent to the selected set point temperature. U.S. Pat. No. 4,419,866, which is assigned to the same assignee as the present application, describes a transport refrigeration system which be selectively operated in a continuous, or a start-stop mode, as desired.

Returning to FIGS. 1 and 2, in addition to the eight bit T word, thermostat 22 provides a plurality of additional digital output signals H/C, HS/LS, IR/NIR, HLO, and D, which indicate various commanded operating modes of thermostat 22 at any instant, as well as an analog indication SP of the set point temperature which has been selected via set point selector 24.

Digital signal H/C indicates whether the commanded mode is a heating cycle or a cooling cycle via logic 1 and logic 0 levels, respectively. Digital signal HS/LS indicates whether the commanded mode is high speed or low speed via logic 1 and logic 0 levels, respectively, when the refrigerant prime mover includes an internal combustion engine operable at a selected one of high and low speeds, such as 2200 RPM and 1400 RPM. Digital signal IR/NIR indicates whether the temperature of the load space 20 is "in-range", or "not-in-range" via logic 1 and logic 0 levels, respectively. The in-range and not-in-range positions relative to set point for falling and rising temperatures are indicated in the digital algorithm of FIG. 3. Digital signal HLO indicates whether or not the heat cycle has been locked out, with a logic 1 indicated the heat cycle has not been locked out, and with a logic 0 indicating heat lock out. The heat cycle is automatically locked out, or prevented, when the set point temperature selector 24 is set to a position below a predetermined value, such as below 20° F. or 15° F., for example. Thus, heat is locked out when a frozen load is carried in cargo space 20.

The analog output SP provides a voltage magnitude proportional to the selected set point temperature, ie., the temperature selected via set point selector 24. For example, 1.0 volt may indicate a set point of $-20°$ F., 2.0 volts any indicate a set point of 30° F., and 3.0 volts may indicate a set point of 80° F.

The hereinbefore described digital and analog outputs of thermostat 22, as well as the outputs of temperature sensors 28 and 30, are applied to a monitoring function 34, hereinafter referred to as tracker 34, which is constructed according to the teachings of the invention. The word "tracker" is used because monitoring function 34 is suitable for use in a satellite truck tracking communication system. Tracker 34 is preferably microprocessor based, and thus its functions will be hereinafter described relative to a detailed program or flow diagram, which is collectively set forth in FIGS. 4A, 4B, 4C and 5.

Figure 13:
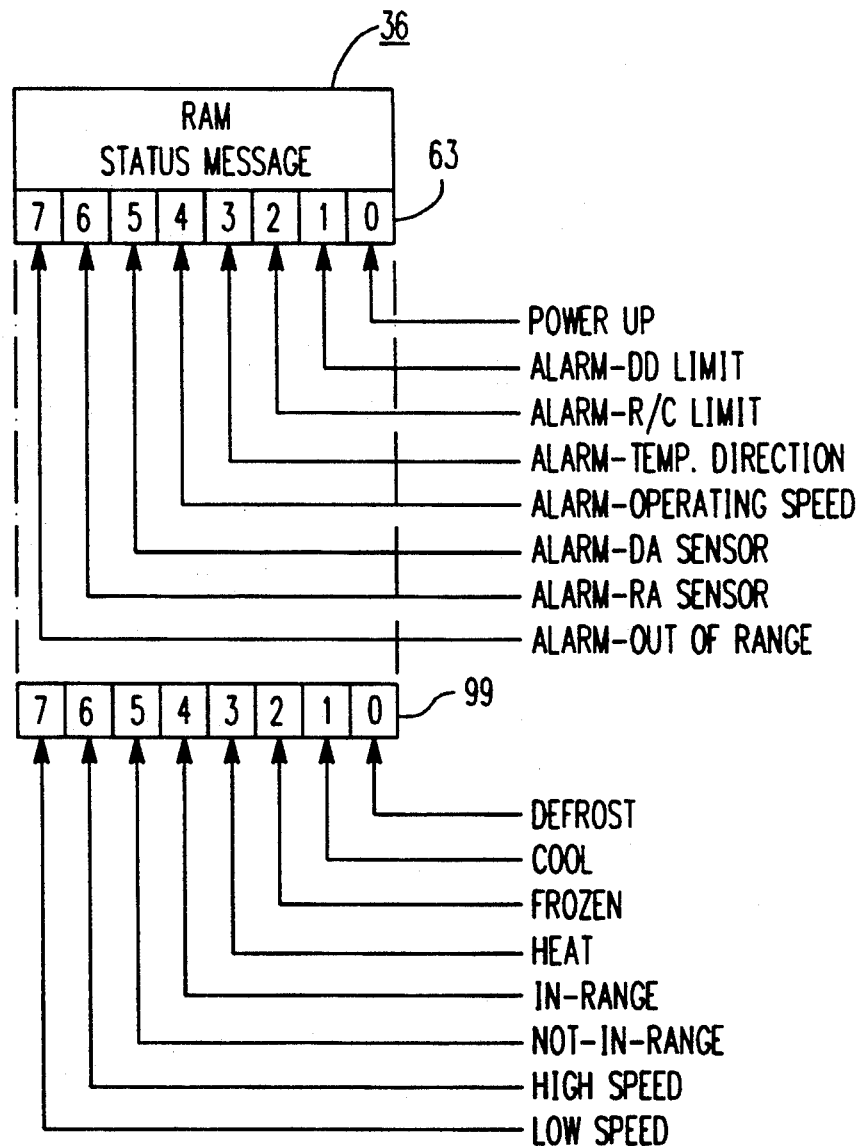

Tracker 34 prepares a status message 36, shown in detail in FIG. 13, which includes the results of various monitoring functions performed via the programs set forth in FIGS. 4A, 4B, 4C and 5. The status message 36 is made available for use by a truck powerline modem 38 which transmits the status message to a powerline modem 40 associated with a transceiver 42 which may be located in the tractor 14. Transceiver 42 sends the status message 36 to a driver display 44 located in cab 16, and when the tractor-trailer 12 is part of a fleet monitored by radio, such as via satellite communication, transceiver 42 additionally sends the status message 36 to a suitable antenna 46. Antenna 46 and transceiver 42 may also receive radio communications from the remote monitoring point to which the status message 36 is transmitted, with such remotely prepared messages being sent to the driver display 44, for example.

Figure 4A:
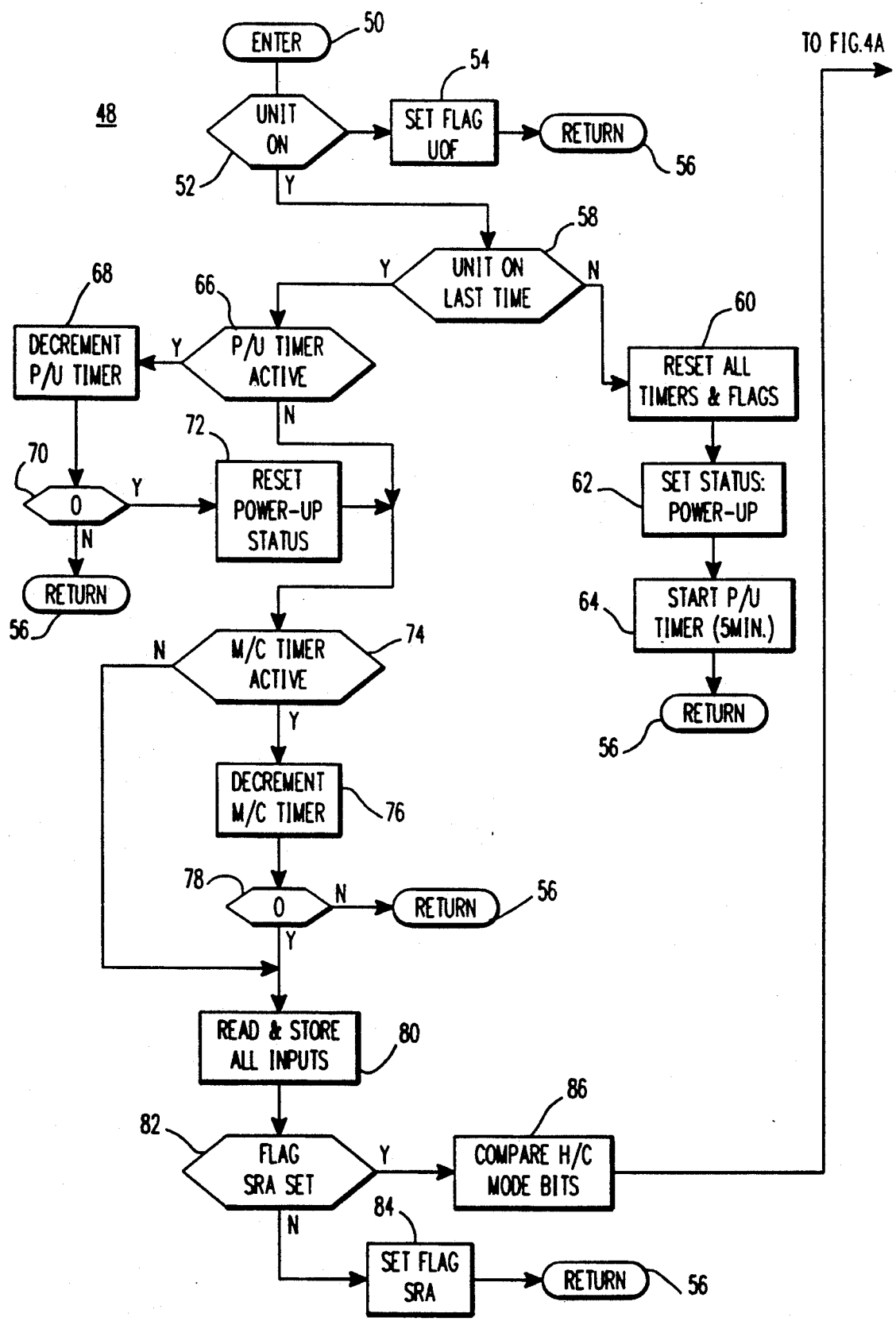
FIGS. 4A, 4B and 4C may be combined to set forth a detailed flow diagram utilized by the microprocessor-based monitoring apparatus or "tracker" shown in block form in FIG. 2, with the program defined by the flow diagram including a unique rate-of-change detector which utilizes the digital output signals from the digital thermostat.
Figure 4B:
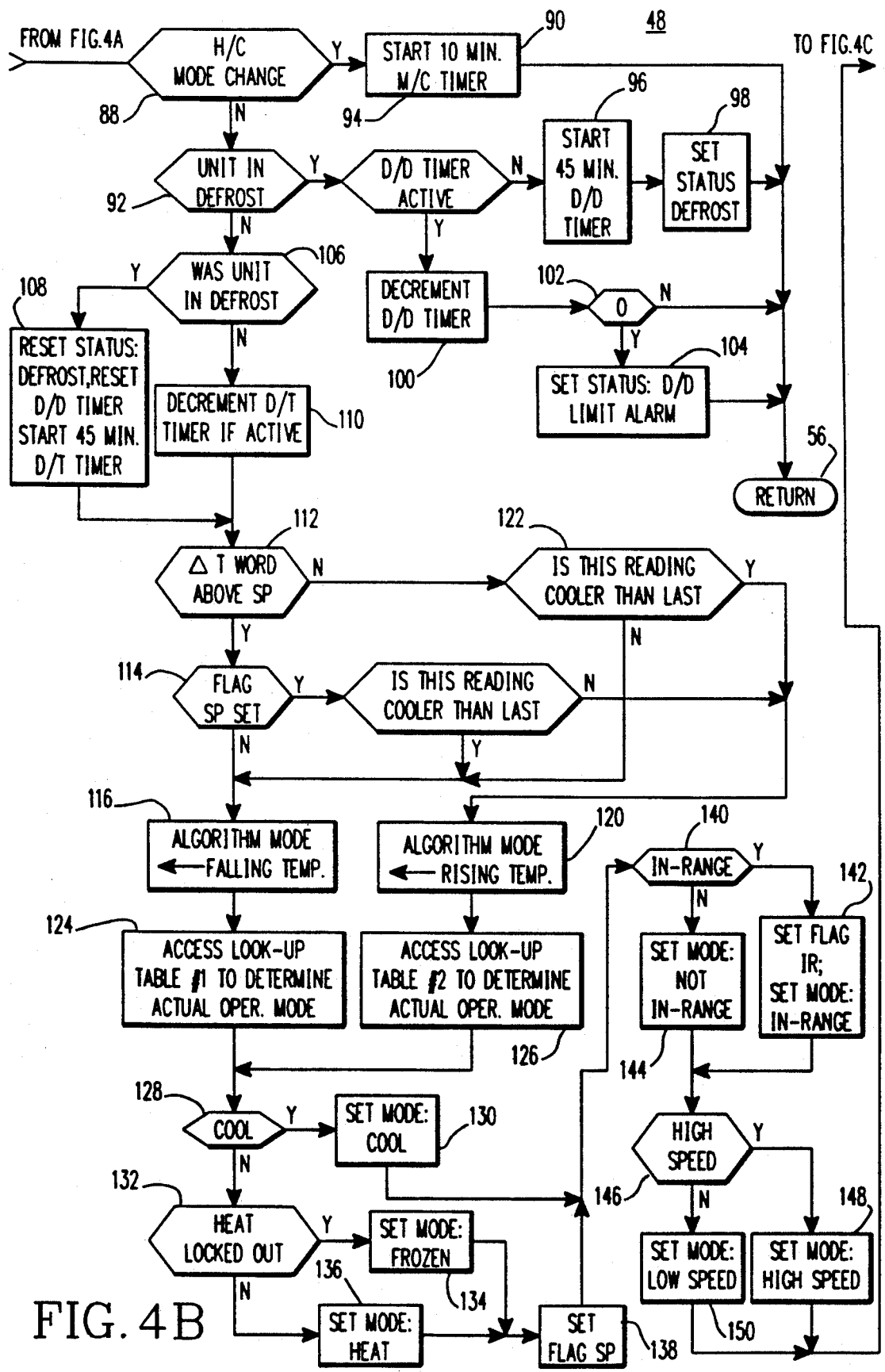
Figure 4C:
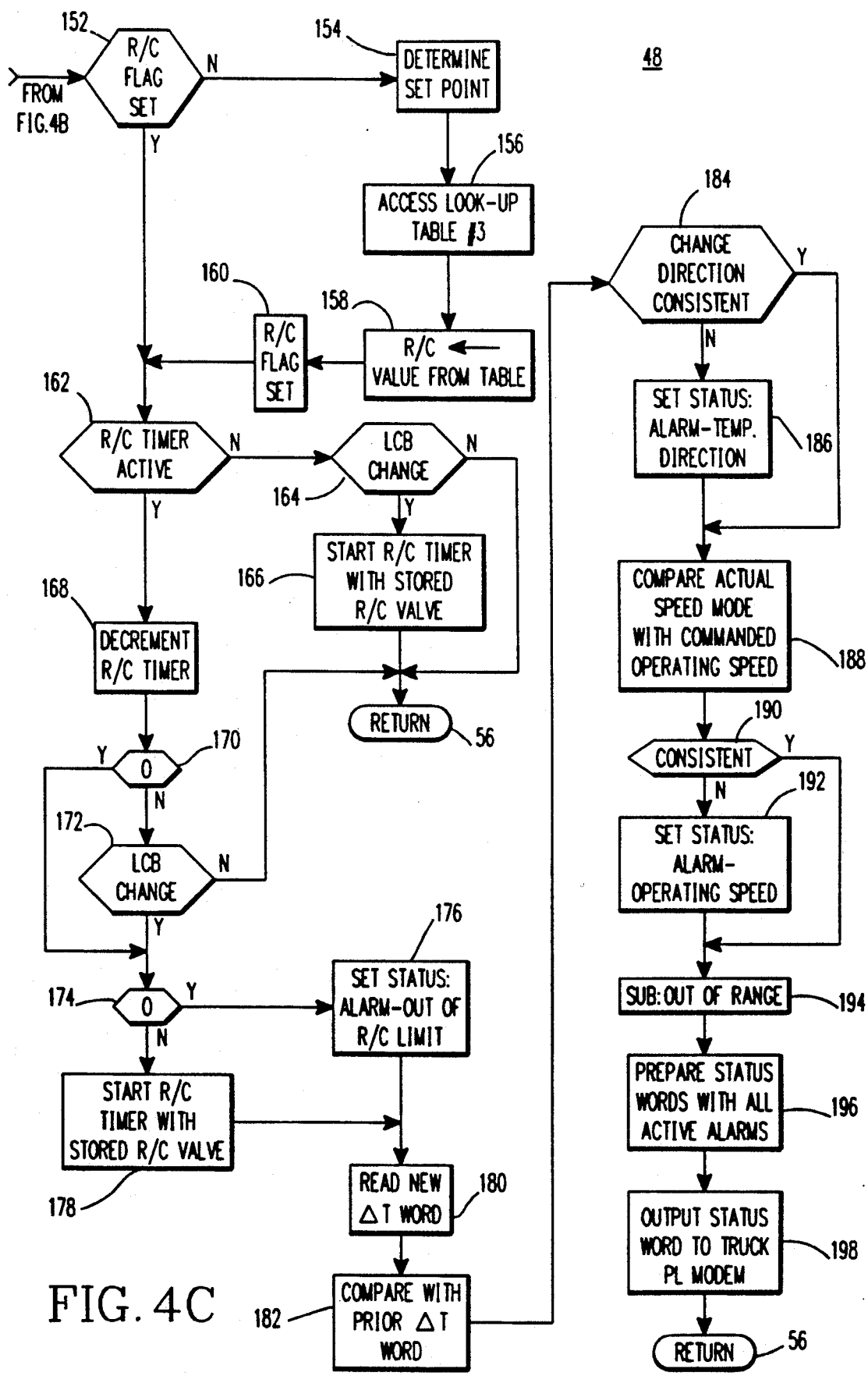

FIGS. 4A, 4B, and 4C may be assembled to provide a detailed program 48 which implements the monitoring functions of tracker 34. Program 48 is entered periodically at 50 and step 52 determines if transport refrigeration unit 10 has been turned "on", eg., has an on-off switch in electrical control associated with unit 10 been manually moved from an "off" to an "on" position? If step 52 finds that unit 10 is "off", step 54 stores a notation of that fact, eg., a program flag UOF is set which is shown in a RAM map 55 in FIG. 10, and program 48 exits at 56, such as to an executive program. When step 52 finds unit 10 has been activated, step 52 advances to step 58 which determines if unit 10 was "off" on the last entry of program 48, checking the logic level of the hereinbefore mentioned flag UOF.

Upon finding that unit 10 has just been activated, step 58 proceeds to step 60 which resets the bits in status message 36, and it resets all program timers and flags, including flag UOF. Status message 36 is shown in FIG. 13 and the timers and flags are shown in the RAM maps of FIGS. 9 and 10. Step 62 sets bit #0 of a first 8-bit word 63 in the status message 36 shown in FIG. 13, to indicate that unit 10 is in the process of being powered up, and step 64 starts a power-up software timer P/U, such as by setting it to expire in 5 minutes. Timer P/u is shown in RAM map 65 of FIG. 9. Program 48 then exits at 56.

The next time program 48 is entered, step 58 will find flag UOF reset, and step 58 branches to step 66 which determines if the P/U timer is active. If timer P/U is active, step 68 decrements timer P/U and step 70 determines if this decrement brings the timer value to 0. If the 5 minute power-up time has not expired, step 70 exits program 48 at 56. Steps 52, 58, 66, 68 and 70 will be repeated each time program 48 is entered, until step 70 finds the 5 minute power-up time has expired. Step 70 then proceeds to step 72 which resets bit 0 of the first 8-bit word 63 of status message 36, and step 72 proceeds to step 74.

Step 74 checks a mode change timer M/C, to determine if it is active. When transport refrigeration unit changes from a cooling cycle to a heating cycle, or from a heating cycle to a cooling cycle, the various readings will be in a transient state for a short period of time and should not be used to make diagnostic decisions. When unit 10 is operating properly in a continuous the unit to hold set point by switching back and forth between cooling and heating cycles, which may keep timer M/C active. However, since this is normal operating state, there will be no malfunctions to detect and report. When a mode change is detected, as will be observed later in program 48, timer M/C is set to a predetermined value, eg., 10 minutes. When timer M/C is found to be active, step 76 decrements the timer, and step 78 determines when it has expired, exiting program 48 on each running thereof until step 78 finds timer M/C has been decremented to 0.

Step 78 advances to step 80 when timer M/C has a 0 reading, and step 80 reads and stores all inputs from digital thermostat 22. Step 82 checks a "stored readings available" flag SRA, to determine if step 80 is storing readings for the first time since power up. If readings are being stored for the first time, there are no prior readings to compare them with and flag SRA will be found to be in a reset condition. Step 82 thus proceeds to step 84 which sets flag SRA and program 48 exits at 56.

The next time program 48 is entered, step 80 will store all inputs, now providing a current or latest reading, for comparison with the immediately preceding reading, as shown in the RAM map 81 of FIG. 12. Step 80 then proceeds to step 82, and step 82 will now find flag SRA set and proceed to step 86. Step 86 compares the logic levels of the H/C mode bits from the current and prior readings thereof, and step 88 checks the results of the comparison to determine if thermostat 22 has commanded a mode change from a cooling cycle to a heating cycle, or vice versa. When step 88 detects such a mode change, step 90 starts the hereinbefore mentioned timer M/C, such as by setting it to the hereinbefore mentioned exemplary value of 10 minutes. Step 90 then exits program 48 at 56.

When step 88 detects no mode change, step 88 proceeds to step 92 which determines if unit 10 is in a defrost cycle by checking the logic level of input D from thermostat 22. If input D is high, indicating defrost, step 94 determines if a defrost duration timer D/D has been activated. The defrost duration timer has two functions. It prevents program 48 from making diagnostic decisions while it is active, and it is set to a value which is longer than the longest normal defrost cycle. Thus, if unit 10 is still in defrost when timer D/D expires, an appropriate alarm is set, indicating an extended defrost cycle.

More specifically, when step 92 finds unit 10 in defrost and step 94 finds timer D/D is not active, step 96 starts timer D/D by loading it with a predetermined value, such as a value which will take 45 minutes to decrement to 0. Step 98 sets an appropriate bit in status message 36 to indicate unit 10 is in defrost, such as by setting bit 0 of a second 8-bit status word 99, and program 48 exits at 56. The next time program 48 is entered, step 94 will find timer D/D active and step 94 branches to step 100 which decrements timer D/D. Step 102 detects the decrementing of timer D/D to 0, which should not occur during normal defrost cycles. If step 102 does detect that timer D/D has been decremented to 0 by step 100, step 104 sets bit #1 of the first status message word 63 to indicate that unit 10 has been in defrost too long, ie., for the 45 minute duration of timer D/D, and program 48 is exited at 56.

During normal operation, step 92 will detect that unit 10 is not in defrost before the expiration of timer D/D, and step 92, upon finding unit 10 is not in defrost, advances to step 106. Step 106 checks the logic level of input D of the prior set of stored readings to determine if defrost has been just terminated. If defrost has just terminated, step 108 resets bit 0 of the second 8-bit status word 99 in status message 36. Step 108 also resets defrost duration timer D/D, and it activates a timer D/T, such as by loading timer D/T with a 45 minute value. Timer D/T is thus active for 45 minutes, for example, following each defrost operation. The state of timer D/T is checked by a subroutine shown in FIG. 5, in order to make sure that operating conditions of unit 10 have returned completely to normal following a defrost operation, before making a diagnostic decision "out-of-range", as will be hereinafter explained. The next time program 48 is entered, step 106 will find that defrost has not just been terminated, and step 106 goes to step 110 which decrements timer D/T, if active.

Steps 108 and 110 both proceed to step 112 which initiates a portion of program 48 which determines the actual operating mode of unit 10 from the value of the digital signal or T word provided by thermostat 22. Step 112 checks the MSB to determine if cargo space 20 is above set point. The MSB is a logic zero above set point, and a logic one at set point and below, as observed from the digital algorithm in FIG. 3. If step 112 finds the MSB is a logic zero, step 114 checks a flag SP to determine if unit 10 has reduced the temperature of cargo space 20 to set point since power-up. If flag SP is not set, unit 10 is still in a temperature pull-down mode, and step 114 proceeds to step 116 which sets an appropriate bit in RAM to indicate the algorithm mode is "falling temperature", which is set forth along the left-hand side of the digital algorithm shown in FIG. 3.

If step 114 finds that flag SP has been set, step 118 compares the digital value of the present digital signal with the digital value of the prior reading to determine if the temperature in cargo space 20 is falling or rising. If the present reading is "cooler" than the last reading, the temperature in cargo space 20 is falling, and step 118 proceeds to the hereinbefore described step 116, which sets an appropriate bit in RAM to indicate that the algorithm mode is "falling temperature". If the present reading is not cooler than the last reading, step 118 proceeds to step 120 which sets an appropriate bit in RAM to indicate that the algorithm mode is "rising temperature", which is shown along the right-hand side of the digital algorithm in FIG. 3.

If step 112 finds that the MSB is a logic one, it proceeds to step 122 which compares the latest and prior readings of the T word to determine the direction of any temperature change. If the latest reading is cooler than the prior reading, step 122 proceeds to step 116, and if it is not cooler, step 122 proceeds to step 120.

If program 48 proceeded to step 116, step 124 accesses look-up table #1 shown in the ROM map 125 of FIG. 6, using the value of the T word as the entry to the look-up table. Look-up table #1 stores the operating modes for a falling temperature, shown along the left-hand side of the digital algorithm of FIG. 3. If program 48 proceeded to step 120, instead of to step 116, step 126 accesses look-up table #2 shown in the ROM map 127 of FIG. 7, again using the value of the T word. Look-up table #2 stores the operating modes for a rising temperature.

Steps 116 and 120 both proceed to step 128 which initiates a portion of program 48 which sets various bits in RAM, as set forth in the RAM map 129 of FIG. 11, to indicate the actual current operating modes of unit 10, with the bits in the RAM map 129 of FIG. 11 being used in the second 8-bit word 99 of status message 36, as set forth in FIG. 13.

More specifically, step 128 checks the operating mode obtained from the appropriate look-up table #1 or #2 to determine if unit 10 is in a cooling cycle. If so, step 130 sets a bit in the RAM map 129 of FIG. 11 to indicate a cooling cycle. If step 128 does not find a cooling cycle, step 128 goes to step 132 which checks the level of input signal HLO to determine if heating cycles have been locked out by the selection of the set point temperature. If HLO is a logic 0, step 132 proceeds to step 134 which sets a bit in RAM map 129 of FIG. 11 to indicate a frozen load. If step 132 finds heat has not been locked out, ie., signal HLO is a logic 1, step 132 proceeds to step 136 which sets a bit in RAM map 129 of FIG. 11 to indicate a heating cycle. Steps 134 and 136 proceed to step 138 which sets flag SP to indicate that set point has been reached. Steps 130 and 138 both proceed to step 140 to determine if the load temperature is "in-range". If so, step 142 sets a flag IR, and it also sets a bit in RAM map of FIG. 11 to indicate the load temperature is "in-range". If step 140 finds that the load temperature is not-in-range, step 144 resets flag IR and it sets an appropriate bit in RAM map 129 of FIG. 11.

Steps 142 and 144 both proceed to step 146 to determine if the operating mode is high or low speed. If high speed, step 146 proceeds to step 148 which sets a bit in RAM map 129 of FIG. 11 to indicate a high speed mode, and if step 146 finds a low speed mode, step 146 proceeds to step 150 which sets a bit in RAM map 129 FIG. 11 to indicate low speed operation.

Steps 148 and 150 both proceed to step 152 which initiates a portion of program 48 which determines if the rate-of-change of load temperature is within an acceptable limit, with the acceptable limit being a function of the selected set point temperature setting. Step 152 checks a flag R/C to determine if a rate-of-change time value has been determined as a function of the set point setting, and appropriately stored for later use in program 48. If step 152 finds that flag R/C has not been set, it indicates that the proper rate-of-change time value has not yet been determined. Step 152 then proceeds to step 154 which determines the set point temperature selected on set point selector 24, using the analog input SP from digital thermostat 22. Step 154 then proceeds to step 156 which accesses look-up table #3 shown in the ROM map 157 of FIG. 8, using the value of the set point determined in step 154. Step 158 then stores the rate-of-change time value obtained from look-up table #3 at an appropriate storage point R/C in RAM.

Steps 152 and step 160 both proceed to step 162 which determines if a rate of change timer R/C is active. If timer R/C is not active, step 162 proceeds to step 164 which detects a change in the LSB by comparing the latest and prior readings of successive T words. If no change is detected, step 164 exits program 48 at 56. If a change in the LSB is detected, step 166 starts timer R/C shown in RAM map 65 of FIG. 9, by loading it with the time value R/C stored in RAM via step 158, and program 48 exits at 56.

If step 162 finds timer R/C is already active, step 162 proceeds to step 168 which decrements timer R/C. Step 168 proceeds to step 170 which determines if timer R/C has just been decremented to 0 by step 168. If timer R/C is not 0, step 172 determines if the LSB has changed in the same manner as described relative to step 164. If the LSB has not changed, step 172 exits program 48 at 56.

If step 170 finds timer R/C has expired it proceeds to step 174, as does step 172 when it finds that the LSB has changed. Step 174 then determines which of the steps 170 or 172 broke the program out of the delay loop by determining if timer R/C is 0. If timer R/C is 0 it indicates the load temperature is not responding properly relative to the particular set point selected on selector 24, and step 174 proceeds to step 176 which sets bit #2 of the first status word 63 in status message 36 shown in FIG. 13.

If step 174 finds timer R/C is not 0, then the LSB changed before timer R/C timed out, indicating acceptable performance, and step 174 proceeds to step 178 which re-sets and starts timer R/C with the R/C time value stored in step 158. Steps 172 and 174 just found that the LSB changed with the latest reading of the T word, and thus the R/C timer is appropriately reset and re-activated at this time. If step 174 found timer R/C to have timed out, then on the next running of program 48 step 162 will find that timer R/C is not active, and it will be reactivated with the next LSB change via steps 164 and 166.

Steps 176 and 178 both advance to step 180 which initiates a portion of program 48 which makes additional diagnostic tests to determine if the actual operating modes of unit 10, as determined from the value of the T word, are consistent with the commanded operating modes, as determined from the commanded operating mode inputs provided by thermostat 22.

More specifically, step 180 reads the value of the latest T word and step 182 compares it with the previously stored value to determine the direction of change of the load temperature. Step 184 determines if the direction of change is consistent with the commanded mode indicated by the logic level of input signal H/C. If the logic level of signal H/C is low, indicating cooling, and steps 180, 182 and 184 found the temperature did not rise, the actual mode is consistent with the commanded mode; and, if signal H/C is high, indicating heating, and steps 180, 182 and 184 found the temperature did not drop, the actual mode is also consistent with the commanded mode. If the temperature rises while H/C is low, or falls while H/C is high, then the actual mode is not consistent with the commanded mode, and step 192 sets bit #3 of the first word of status message 36 to indicate that fact. It will be remembered that the mode change timer M/C prevents such a comparison during the unstable time immediately following a mode change, so when step 186 sets the appropriate alarm bit it is doing so during a stable operating time and should be an accurate diagnosis that there is a malfunction.

When step 184 finds the temperature change is consistent with the commanded mode it proceeds to step 188, as does step 186 after setting the alarm bit. Step 188 compares the actual operating speed, as stored in RAM map 129 of FIG. 11, with the commanded mode as indicated by the logic level of input signal HS/LS. If they are not consistent, step 190 proceeds to step 192 which sets bit #4 of the first status word in status message 36, to indicate a malfunction in operating speed.

Step 192 proceeds to step 194, as does step 190 when the operating speed is consistent with the commanded speed. Step 194 calls a subroutine shown in FIG. 5, to perform another diagnostic test, utilizing only the inputs from temperature sensors 26 and 30 and the selected set point temperature. Any alarms generated in the subroutine of FIG. 5 are inserted into the first status word 63 of message 36, and the subroutine then returns to step 196.

Step 196 prepares the status message 36, which already includes all active alarms, and the information shown in RAM map 129 of FIG. 11 is also added to the message. Step 198 then outputs the status message to the truck powerline modem 38, and program 48 is exited at 56.

Figure 5:
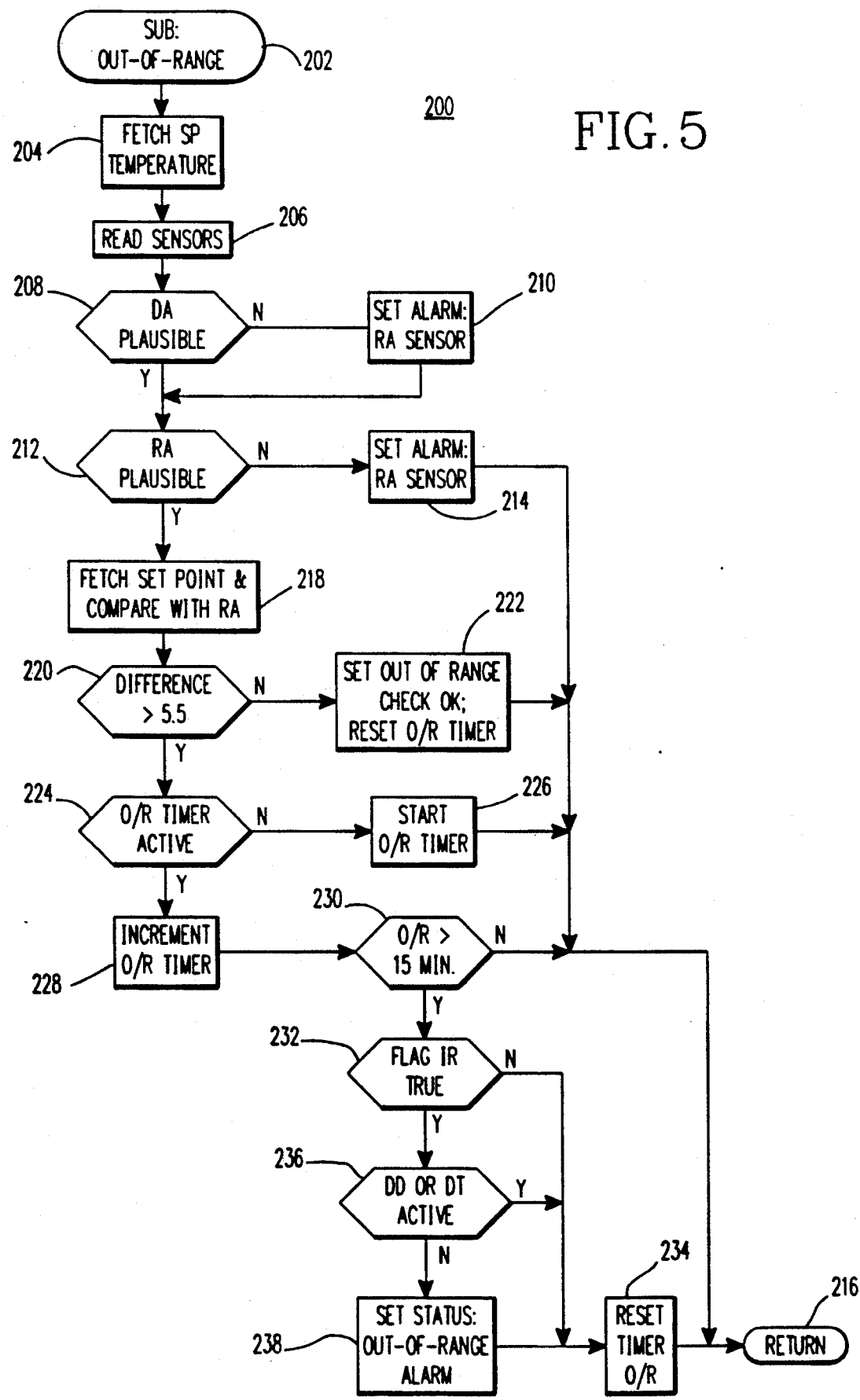
FIG. 5 is a subroutine which is called by the program of FIGS. 4A, 4B and 4C, to perform an unique out-of-range monitoring function which utilizes the same load temperature sensors and same set point temperature utilized by the digital thermostat in controlling the temperature of the conditioned load space.

As hereinbefore stated, step 194 calls the subroutine shown in FIG. 5. FIG. 5 sets forth a program 200 for implementing a diagnostic check which detects when the load temperature stays out-of-range for an abnormal amount of time, indicating a malfunction, such as inadequate refrigeration capacity. Program 200 is entered at 202 and step 204 reads and stores the input SP from thermostat 22 which indicates the value of the selected set point temperature.

Step 206 then reads the inputs received by tracker 34 directly from the cargo space temperature sensors 26 and 30. Step 208 compares the reading provided by the discharge air temperature sensor 30 with limits which define a plausible range. The limits may be static, i.e., set to cover a plausible range regardless of the selected set point, or dynamic, i.e., set to cover a plausible range relatively close to the selected set point temperature. If dynamic, step 208 would access a look-up table similar to look-up table #3, except instead of the set point deriving the R/C time value, it would retrieve upper and lower limits for the specific set point. If step 208 finds that discharge air sensor 30 is not providing a plausible value, step 208 proceeds to step 210 which sets bit #5 of the first word of status message 36.

Step 208, when it finds the discharge air sensor 30 functional, and step 210 after setting the alarm that the discharge air temperature sensor 30 is malfunctioning, both proceed to step 212. Step 212 is similar to step 208 just described, except it performs the plausibility check for the return air sensor 26. If step 212 finds return air sensor 212 is not returning values in a plausible range, step 212 proceeds to step 214 which sets bit #6 of the first word 63 of status message 36, to indicate a malfunctioning return air sensor. Step 214 then proceeds to exit 216, returning to program 48, as the remainder of program 200 requires a properly functioning return air sensor.

When step 212 finds the return air sensor 26 is functioning properly, step 212 proceeds to step 218 which obtains the absolute difference, eg., without algebraic sign, between the temperature indicated by the return air sensor 26 and the selected set point temperature. Step 220 compares this difference value with a predetermined value, such as 5.5° F. If the difference does not exceed 5.5° F., step 222 sets the out-of-range check "OK, by setting an appropriate bit in microprocessor RAM, and program 200 returns to program 48 at 216. Step 222 also resets an out-of-range timer O/R, if active, as will now be explained.

If step 220 finds that the difference exceeds 5.5° F., it proceeds to step 224 which determines if timerO/R is active. If it is not active, step 226 starts timer O/R and returns to program 48. If timer O/R has already been activated by a prior running of subroutine 200, step 224 goes to step 228 which increments timer O/R. Step 228 proceeds to step 230 which determines if the time accumulated on timer O/R has exceeded a predetermined value, such as 15 minutes. The predetermined value is selected to give unit 10 time to reduce the difference below the 5.5 threshold if unit 10 has been operating and has already reduced the temperature of cargo space 20 to an "in-range" value since power-up. If step 230 finds that timer O/R has not exceeded 15 minutes, program 200 returns at 216 to the main program 48.

If step 230 finds that timer O/R has exceeded 15 minutes, then step 230 proceeds to step 232 to determine if unit 10 has ever reduced the load temperature to "in-range" values since power-up. This is done by checking flag IR, which is set in step 142 the first time an "in-range" value is reached. If flag IR is not true, i.e., a logic 0, unit 10 is still in initial temperature pulldown, which may take longer than 15 minutes, depending upon the cargo and the ambient temperature. Step 232, upon finding flag IR a logic 0, proceeds to step 234 which stops and resets timer O/R, and step 234 proceeds to the program exit 216.

If step 232 finds flag IR true, step 232 proceeds to step 236 which determines if either the defrost duration timer DD or the defrost termination timer DT, which is activated when defrost terminates, is active. If either is active, the 15 minutes accumulated on timer O/R may not be an indication of a malfunction, and step 236 proceeds to step 234 to stop and reset timer O/R.

If step 236 finds that neither timer DD nor timer DT are active, then the 15 minutes accumulated on timer O/R indicates an abnormal amount of time for the temperature difference between the return air and set point to exceed 5.5, and step 236 proceeds to step 238 which sets bit #7 of the first word 63 of status message 36, and step 238 proceeds to step 234 and to the program exit 216, to return to the main program 48.

We claim:

1. A method of monitoring a transport refrigeration unit which conditions a load in a cargo space to a selected set point temperature via commanded cooling and heating cycles, comprising the steps of:
determining the temperature of the conditioned load,
providing a digital signal as a function of the load temperature and the set point temperature, with each toggle of the least significant bit (LSB) of the digital signal indicating a predetermined change in load temperature,
starting timing means having a predetermined timing period in response to the toggling of the LSB,
selecting the predetermined timing period as a function of the selected set point temperature,
and providing an alarm signal when the selected timing period expires before the next toggle of the LSB.

2. The method of claim 1 including the step of transmitting the alarm signal to a location remote from the transport refrigeration unit.

3. The method of claim 2 wherein the transport refrigeration unit is associated with a vehicle having a cab, with the step of transmitting the alarm signal transmitting the alarm signal to the cab.

4. The method of claim 2 including the step of providing radio means, with the step of transmitting the alarm signal transmitting the alarm signal to the remote location via the radio means.

5. The method of claim 1 including the steps of:
providing a command signal which indicates the commanded operating cycle of the transport refrigeration unit,
comparing the digital signal after a toggle of the LSB with the prior digital signal to determine the direction of load temperature change,
comparing the direction of load temperature change with the command signal,
and providing an alarm signal when the direction of temperature change is not consistent with the commanded operating mode indicated by the command signal.

6. The method of claim 1 including the steps of:
comparing the temperature of the load with the selected set point temperature to provide a difference value,
comparing the difference value with a first predetermined value,
starting timing means when the difference value exceeds the first predetermined value,
and providing another alarm signal when the difference value continues to exceed the first predetermined value for a predetermined period of time.

7. The method of claim 6 including the steps of:
storing a predetermined signal when the load temperature is equal to a second predetermined value, with the second predetermined value being closer to the selected set point temperature than the first predetermined value,
determining if the predetermined signal has been stored, prior to the step of providing the different alarm signal,
and wherein the step of providing another alarm signal is responsive to said determining step, providing said another alarm signal only when the determining step finds that the predetermined signal has been stored.

8. The method of claim 6 including the steps of:
providing a defrost cycle,
timing the length of time since the termination of a defrost cycle,
and wherein the step of providing another alarm signal provides another alarm signal only when:
(1) the transport refrigeration system is not in a defrost cycle, and of time has expired
(2) a predetermined period of time has expired following the termination of a defrost cycle.

9. The method of claim 1 including the steps of:
providing a defrost cycle,
timing the defrost cycle,
and providing an alarm signal when the defrost cycle exceeds a predetermined period of time.

10. The method of claim 1 including the steps of:
providing look-up table means which relates the value of the digital signal to the actual operating mode of the transport refrigeration system,
providing a signal indicative of a commanded operating mode,
accessing the look-up table means with the latest value of the digital signal to obtain the actual operating mode,
comparing the signal indicative of the commanded operating mode with the actual operating mode,
and providing an alarm signal when the comparison steps finds the actual operating mode is not consistent with the commanded operating move 11. The method of claim 10 wherein the transport refrigeration system includes a refrigerant compressor driven by a prime mover at one of two commanded operating speeds, and wherein:
the step of providing a signal indicative of the commanded operating mode includes the step of providing the commanded operating speed,
the step of providing look-up table means includes the step of providing an operating speed associated with each digital signal,
the comparison step includes the step of comparing the commanded operating speed with the operating speed obtained from the look-up table means,
and the step of providing an alarm signal provides an alarm signal when the operating speed obtained from the look-up table means is not consistent with the commanded operating speed.

12. A transport refrigeration system which conditions a load in a cargo space to a selected set point temperature via cooling and heating cycles, comprising:
sensor means providing a signal indicative of the temperature of the conditioned load,
set point selector means providing a signal indicative of the selected set point temperature,
thermostat means which provides a digital signal as a function of the load temperature and the set point temperature, with each toggle of the least significant bit (LSB) of the digital signal indicating a predetermined change in load temperature,
timing means,
means responsive to the toggling of the LSB for causing said timing means to initiate a predetermined timing period,
means dynamically selecting the predetermined timing period of the timing means as a function of the magnitude of the set point temperature,
and alarm means responsive to the toggling of the LSB and the predetermined timing period, providing an alarm signal when the selected timing period expires before the next toggle of the LSB.

13. The transport refrigeration system of claim 12 including transmitter means transmitting the alarm signal to a location remote from the transport refrigeration system.

14. The transport refrigeration system of claim 13 wherein the transport refrigeration system is associated with a vehicle having a cab, with the transmitter means transmitting the alarm signal to the cab.

15. The transport refrigeration system of claim 13 wherein the transmitter means includes radio means.

16. The transport refrigeration system of claim 12 wherein the thermostat means provides a command signal which indicates the commanded operating mode of the transport refrigeration system, and including:
means comparing the digital signal after a toggle of the LSB with the prior digital signal to determine the direction of load temperature change,
means comparing the direction of load temperature change with the command signal,
and wherein the alarm means includes means providing an alarm signal when the direction of temperature change is not consistent with the commanded operating mode indicated by the command signal.

17. The transport refrigeration system of claim 12 including:
means comparing the temperature of the conditioned load with the set point temperature to provide a difference value,
and means comparing the difference value with a first predetermined value,
and wherein the timing means includes a timer which is activated when the difference value exceeds the first predetermined value,
with the alarm means including means providing another alarm signal when the difference value continues to exceed the first predetermined value for a predetermined period of time.

18. The transport refrigeration system of claim 17 including:
means detecting when the load temperature is equal to a second predetermined value, with the second predetermined value being closer to the set point temperature than the first predetermined value,
means responsive to the detecting means for storing a predetermined signal when the load temperature is equal to said second predetermined value,
and means detecting whether or not the predetermined signal has been stored,
with the alarm means for providing the another alarm signal providing said another alarm signal only when the detecting means finds that the predetermined signal has been stored.

19. The method of claim 17 including:
means providing a defrost cycle,
and means timing the length of time since the termination of a defrost cycle,
and wherein the alarm means for providing the another alarm signal provides said another alarm signal only when:
(1) the transport refrigeration system is not in a defrost cycle, and
(2) a predetermined period of time has expired following the termination of a defrost cycle.

20. The transport refrigeration system of claim 12 including:
means providing a defrost cycle,
and means timing the defrost cycle,
and wherein the alarm means includes means for providing an alarm signal when the defrost cycle exceeds a predetermined period of time.

21. The transport refrigeration system of claim 12 wherein the thermostat means provides a signal indicative of a commanded operating mode, and including:
look-up table means which relates the value of the digital signal to the actual operating mode of the transport refrigeration system, means accessing the look-up table means with the latest value of the digital signal to obtain the actual operating mode, comparator means comparing the signal indicative of the commanded operating mode with the actual operating mode, and wherein the alarm means includes means for providing an alarm signal when the comparison step finds the actual operating mode is not consistent with the commanded operating mode.

22. The transport refrigeration system of claim 21 wherein the refrigeration system includes a refrigerant compressor driven by a prime mover at one of two commanded operating speeds, and wherein:

the signal provided by the thermostat means which is indicative of the commanded operating mode includes the commanded operating speed, the look-up table means includes an operating speed associated with each digital signal, the comparator means compares the commanded operating speed with the operating speed obtained from the look-up table means, and the alarm means provides an alarm signal when the operating speed obtained from the look-up table means is not consistent with the commanded operating speed.

* * * * *